US008341231B2

(12) United States Patent
Wan et al.

(10) Patent No.: US 8,341,231 B2
(45) Date of Patent: Dec. 25, 2012

(54) SYSTEMS AND METHODS FOR PROCESSING HEARTBEAT MESSAGES

(75) Inventors: Calvin Wan, Plano, TX (US); Kumaravel Senthivel, Murphy, TX (US)

(73) Assignee: Fujitsu Limited, Kawasaki-shi (JP)

( * ) Notice: Subject to any disclaimer, the term of this patent is extended or adjusted under 35 U.S.C. 154(b) by 533 days.

(21) Appl. No.: 12/683,750

(22) Filed: Jan. 7, 2010

(65) Prior Publication Data

US 2011/0167119 A1 Jul. 7, 2011

(51) Int. Cl.
*G06F 15/16* (2006.01)
(52) U.S. Cl. .......................... 709/206; 709/224; 709/220
(58) Field of Classification Search .......... 709/206–207, 709/223–224, 220
See application file for complete search history.

(56) References Cited

U.S. PATENT DOCUMENTS

| 7,330,444 | B1 * | 2/2008 | Pasqua ........................... 370/282 |
| 7,451,359 | B1 * | 11/2008 | Coekaerts ..................... 709/224 |
| 7,496,701 | B2 * | 2/2009 | Crawford et al. ................ 710/62 |
| 7,523,197 | B2 * | 4/2009 | Castaneda et al. ............. 709/224 |
| 7,856,480 | B2 * | 12/2010 | Muchow ........................ 709/224 |
| 8,156,219 | B2 * | 4/2012 | Qiu et al. ....................... 709/224 |
| 2006/0250969 | A1 * | 11/2006 | Florit et al. .................... 370/241 |
| 2007/0180077 | A1 * | 8/2007 | Letca et al. .................... 709/224 |
| 2008/0082142 | A1 * | 4/2008 | Clark et al. ...................... 607/60 |
| 2010/0284269 | A1 * | 11/2010 | Zhu ............................... 370/221 |

OTHER PUBLICATIONS

IEEE Std 802.1AX; "Standard for Local and Metropolitan Area Networks"; Link Aggregation; IEEE Computer Society; pp. 163, 2008.

* cited by examiner

*Primary Examiner* — Philip B Tran
(74) *Attorney, Agent, or Firm* — Baker Botts L.L.P.

(57) ABSTRACT

According to one embodiment, a method for processing heartbeat messages includes processing heartbeat messages received at a first network interface integral to a first network element from a second network element to determine a first status parameter associated with the second network element. The method may also include processing heartbeat messages received at a second network interface integral to the first network element from the second network element to determine a second status parameter associated with the second network element. The method may further include determining a status of the second network element based on the first status parameter and the second status parameter.

21 Claims, 1 Drawing Sheet

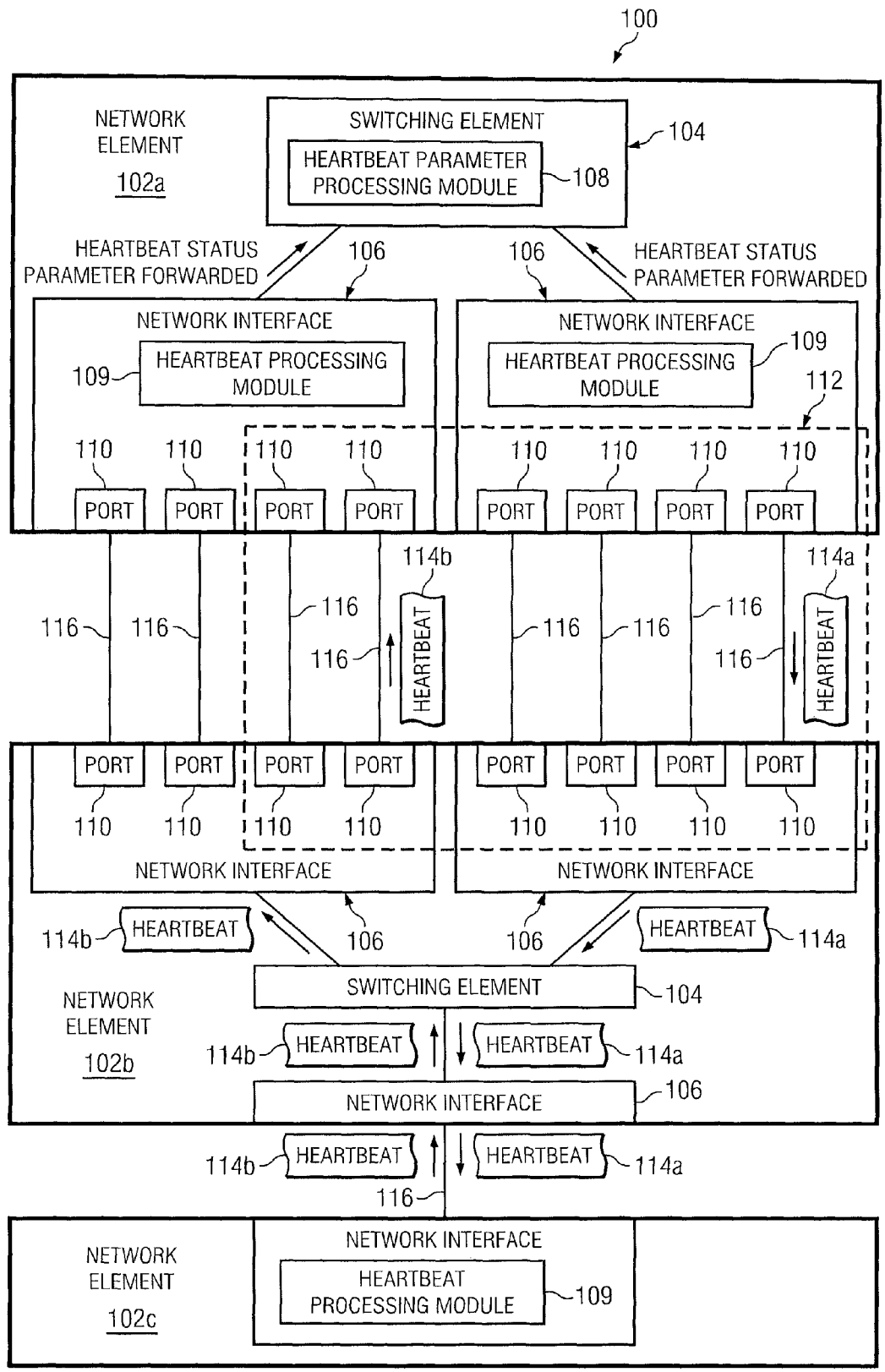

SYSTEMS AND METHODS FOR PROCESSING HEARTBEAT MESSAGES

TECHNICAL FIELD

This invention relates generally to the field of communications systems and more specifically to processing of heartbeat messages in a link aggregation group.

BACKGROUND

A communication network includes network elements that route packets through the network, predominantly in line card hardware. From time to time, such network elements may communicate "heartbeat" messages to each other in order to verify presence and connectivity among the network elements. Failure of a network element to receive a heartbeat message from another network element within a particular time interval may indicate a failure or fault in the network (e.g., a hardware failure, a forwarded table corruption, or other failure that may cause a network service to fail).

Such network elements may also employ link aggregation. Link aggregation (e.g., IEEE 802.1AX-2008) may generally describe the practice of using multiple network cables or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

Despite the functional advantages of LAGs, traditional LAGs may present challenges to processing of heartbeat messages. For example, a heartbeat message from an upstream network element may not be received because the upstream network element may forward the heartbeat message to a LAG port on a line card different from where the line card that is processing heartbeat messages. Existing solutions to this challenge often employ a centralized software approach. Such a centralized software approach may add complexity and reduce performance in situations where heartbeat message processing would otherwise be handled predominantly in hardware.

SUMMARY OF THE DISCLOSURE

In accordance with the present invention, disadvantages and problems associated with previous techniques processing heartbeat messages in a link aggregation group may be reduced or eliminated.

According to one embodiment, a method for processing heartbeat messages includes processing heartbeat messages received at a first network interface integral to a first network element from a second network element to determine a first status parameter associated with the second network element. The method may also include processing heartbeat messages received at a second network interface integral to the first network element from the second network element to determine a second status parameter associated with the second network element. The method may further include determining a status of the second network element based on the first status parameter and the second status parameter.

Certain embodiments of the invention may provide one or more technical advantages. A technical advantage of one embodiment may be that a distributed hardware approach to heartbeat message processing in LAG configurations is provided, thereby potentially reducing complexity and increasing performance over traditional software-based solutions.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which:

FIG. 1 illustrates an example system for processing heartbeat messages in a link aggregation group, in accordance with certain embodiments of the present disclosure.

DETAILED DESCRIPTION OF THE DRAWINGS

Embodiments of the present invention and its advantages are best understood by referring to FIG. 1, like numerals being used for like and corresponding parts of the various drawings.

FIG. 1 illustrates an example system 100 for processing heartbeat messages 114 in a link aggregation group 112, in accordance with certain embodiments of the present disclosure. As depicted, system 100 may include one or more network elements 102a-c (referred to generally herein as network element 102 or network elements 102). Each network element 102 may be coupled to one or more other network elements 102 via transmission media 116. Each network element 102 may generally be configured to receive data from and/or transmit data to one or more other network elements 102. In certain embodiments, network element 102 may comprise a switch configured to route data received by the network element 102 to another device (e.g., another network element 102) coupled to the network element. In addition, although system 100 is depicted as having a three network elements 102, it is understood that system 100 may include any number of network elements 102.

In certain embodiments of system 100, each network element 102 may include one or more services associated with a particular maintenance level. For example, according to relevant Service Operation, Administration, and Management ("Service OAM" or "SOAM") standards, network elements 102a and 102c may be associated with the Customer OAM Level (e.g., may be Maintenance Entity Group End Points (MEPs) of the Customer OAM Level). As another example, network elements 102a and 102c may be associated with the Provider OAM Level and/or Operator OAM Level. In such embodiments, heartbeat messages 114 (e.g., SOAM continuity check messages or "CCMs") may be communicated between network elements 102 at the same level (e.g., network elements 102a and 102c) in order to detect loss of continuity or improper network connections between such network element services.

As depicted in FIG. 1, each network element 102 may include a switching element 104 and one or more network interfaces 106 communicatively coupled to switching element 104.

Each switching element 104 may include any suitable system, apparatus, or device configured to receive data and route such data to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF). As shown in FIG. 1, one or more of switching elements 104 may include a heartbeat parameter processing module 108. As described in greater detail below, each heartbeat parameter processing module 108 of a particular switching element 104 may be configured to process heartbeat status parameters received from network interfaces 106 coupled to the particular switching element 104 in order to determine a status associated with a particular network element 102.

Each network interface 106 may include any suitable system, apparatus, or device configured to serve as an interface between a network element 102 and a transmission medium. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 1, each of network interfaces 106 may include one or more physical ports 110. Each physical port 110 may include any system, device or apparatus configured to serve as a physical interface between a corresponding transmission medium 116 and network interface 106. In some embodiments, each physical port 110 may comprise an Ethernet port.

Also as shown in FIG. 1, one or more of network interfaces 106 may include a heartbeat processing module 109. As described in greater detail below, each heartbeat processing module 109 of a particular network interface 106 may be configured to process heartbeat messages 114 received by the particular network interface 106 to determine a heartbeat status parameter associated with a network element 102. In some embodiments, each heartbeat processing module 109 may implements a continuity check message (CCM) processing module that implements a CCM state machine as described in the IEEE 802.1ag standard. Heartbeat processing module may be implemented in hardware, firmware, software, or any combination thereof.

Each transmission medium 116 may include any system, device, or apparatus configured to couple corresponding ports 110 of network devices 102 to each other and communicate information between the corresponding ports 110. For example, a transmission medium 116 may include an optical fiber, an Ethernet cable, a T1 cable, a WiFi signal, a Bluetooth signal, or other suitable medium.

As shown in FIG. 1, two or more physical ports 110 of a particular network element 102, their corresponding physical ports 110 of another network element 102, and their corresponding transmission media 116 may be grouped into a link aggregation group (LAG) 112. Although LAG 112 is depicted as including a particular number of member physical ports 110, LAG 112 may include any suitable number of member physical ports 110. LAG 112 may combine its member ports or member LAGs using link aggregation such that the member ports are represented as a single logical port to components of system 100 external to LAG 112. For example, in the embodiment shown in FIG. 1, LAG 112 may each appear as a single logical port to switching element 104 of network element 102a and/or switching element 104 of network element 102b.

In operation, one or more of network elements 102 may communicate a heartbeat or "hello" message 114 to other network elements. For example, a heartbeat message 114a may be communicated from network element 102a to network element 102b, which may in turn route and forward the message to network element 102c. Likewise, a heartbeat message 114b may be communicated from network element 102c to network element 102b, which may in turn route and forward the message to network element 102a. Each of such heartbeat messages 114 may be communicated at periodic intervals, and the receipt or non-receipt by a node network element 102 of heartbeat messages 114 may indicate an operational status of other network elements of system 100. For example, receipt of a heartbeat message 114a by network element 102c may indicate to network element 102c that network element 102a is functioning correctly and/or properly coupled to network element 102c. As another example, non-receipt of heartbeat message 114a by network element 102c may indicate to network element 102c that the service monitored by the heartbeat message is in a fault state (e.g., power failure, restart, and/or other failure) and/or is not properly coupled to the network element 102c. In certain embodiments, heartbeat messages 114 may include continuity check messages (CCMs) in accordance with applicable SOAM standards.

In certain embodiments, heartbeat processing module 109 of each network element 106 may be configured to set a heartbeat status parameter related to one or more network elements 102 based on the receipt and non-receipt of heartbeat messages 114. For example, based on the receipt and non-receipt of heartbeat message 114a, heartbeat processing module 109 of network element 102c may set a status parameter associated with network element 102a (e.g., such status parameter indicative of whether a heartbeat message 114a has been received within its associated timeout threshold). Likewise, based on the receipt and non-receipt of heartbeat message 114b, heartbeat processing module 109 of network element 102a may set a status parameter associated with network element 102c (e.g., such status parameter indicative of whether a heartbeat message 114b has been received within its associated timeout threshold).

As discussed above, one or more ports 110 of a network element 102 may be aggregated into a LAG (e.g., LAG 112). Accordingly, when a heartbeat message 114 (e.g., heartbeat message 114b) is communicated to LAG 112, a hashing algorithm or similar procedure may be used to determine the physical port 110 through which heartbeat message 114 will be communicated. For example, switching element 104 of network element 102b may determine, upon receipt of heartbeat message 114b, which of member ports 110 of LAG 112 to distribute heartbeat message 114b. Because heartbeat message 114b may be received at a particular physical port 110 of network element 102a (and thus, by a particular network interface 106), a particular heartbeat processing module 109 of network element 102a may appropriately process heartbeat message 114b while other heartbeat processing modules 109 of network element 102a may not receive and process heartbeat message 114b. Accordingly, a particular heartbeat processing module 109 may not receive heartbeat message 114b within an applicable timeout period, and thus may "think" that a problem exists with network element 102c or between network element 102a and network element 102c despite the fact that network element 102a is properly receiving heartbeat message 114b from network element 102c via LAG 112.

To reduce or eliminate this disadvantage present in traditional networking systems, network interfaces 106 may be further configured to communicate heartbeat status parameters (as determined by heartbeat processing modules 109) to switching element 104 or another component of the particular network element 102. Such switching element 104 or other component may include a heartbeat parameter processing module 108 configured to determine a status related to one or more network elements 102 based on heartbeat status parameters communicated from the network interface 106. For example, if at least one of the network interfaces 106 of network element 102a communicates a heartbeat status parameter indicating that a heartbeat message 114b has properly been received via LAG 112, heartbeat parameter processing module 108 may determine that network element 102c is functional and properly coupled to network element 102a. Otherwise, if none of the network interfaces 106 of network element 102a communicates a heartbeat status parameter indicating that a heartbeat message 114b has properly been received via LAG 112, heartbeat parameter processing module 108 may determine that network element 102c is not functional and/or not properly coupled to network element 102a. Thus, by performing a logical OR operation on the received heartbeat status parameters, heartbeat parameter processing module 108 may determine the appropriate status related to heartbeat message 114b. In addition to receipt or non-receipt of heartbeat messages heartbeat status parameters may indicate any other network service error or occurrence, including without limitation, loss of continuity, unexpected period, unexpected level, unexpected maintenance end point, remote defect indication, or a mismerge.

A component of system 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Certain embodiments of the invention may provide one or more technical advantages. A technical advantage of one embodiment may be that a distributed hardware-based approach may be used to process heartbeat messages communicated through a link aggregation group.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
   a first network interface having:
      at least one first physical port; and
      a first heartbeat processing module configured to process heartbeat messages received from a second network element to determine a first status parameter associated with a second network element; and
   a second network interface having:
      at least one second physical port;
      a second heartbeat processing module configured to process heartbeat messages received from the second network element to determine a second status parameter associated with the second network element; and
   a heartbeat parameter processing module communicatively coupled to the first network interface and the second network interface and configured to:
      receive the first status parameter and the second status parameter; and
      determine a status of the second network element based on the first status parameter and the second status parameter.

2. The network element of claim 1, wherein the at least one first physical port and at the at least one second physical port are configured as member ports of a link aggregation group.

3. The network element of claim 1, wherein:
   the first status parameter is indicative of whether the first network interface has received a heartbeat message from the second network element within a timeout threshold associated with the heartbeat message; and
   the second status parameter is indicative of whether the second network interface has received a heartbeat message from the second network element within the timeout threshold associated with the heartbeat message.

4. The network element of claim 3, the heartbeat parameter processing module further configured to determine the status of the second network element by determining whether at least one of:
   the first status parameter indicates that the first network interface has received the heartbeat message from the second network element within a timeout threshold associated with the heartbeat message; and
   the second status parameter indicates that the second network interface has received a heartbeat message from the second network element within the timeout threshold associated with the heartbeat message.

5. The network element of claim 4, wherein the determined status is indicative of whether at least one of the first network interface and the second network interface has received a heartbeat message from the second network element within the timeout threshold associated with the heartbeat message.

6. The network element of claim 1, wherein the heartbeat message is a Continuity Check Message (CCM) in accordance with a Service Operation, Administration, and Management (Service OAM) standard.

7. The network element of claim 6, wherein the network element and the second network element are of the same Service OAM level.

8. The network element of claim 1, wherein at least one of the first network interface and the second network interface is a line card.

9. A method for processing heartbeat messages, comprising:
- processing heartbeat messages received at a first network interface integral to a first network element from a second network element to determine a first status parameter associated with the second network element; and
- processing heartbeat messages received at a second network interface integral to the first network element from the second network element to determine a second status parameter associated with the second network element; and
- determining a status of the second network element based on the first status parameter and the second status parameter.

10. The method of claim 9, wherein the at least one first physical port and at the at least one second physical port are configured as member ports of a link aggregation group.

11. The method of claim 9, wherein:
- the first status parameter is indicative of whether the first network interface has received a heartbeat message from the second network element within a timeout threshold associated with the heartbeat message; and
- the second status parameter is indicative of whether the second network interface has received a heartbeat message from the second network element within the timeout threshold associated with the heartbeat message.

12. The method of claim 11, wherein determining the status of the second network element comprises determining whether at least one of:
- the first status parameter indicates that the first network interface has received the heartbeat message from the second network element within a timeout threshold associated with the heartbeat message; and
- the second status parameter indicates that the second network interface has received a heartbeat message from the second network element within the timeout threshold associated with the heartbeat message.

13. The method of claim 12, wherein the determined status is indicative of whether at least one of the first network interface and the second network interface has received a heartbeat message from the second network element within the timeout threshold associated with the heartbeat message.

14. The method of claim 9, wherein the heartbeat message is a Continuity Check Message (CCM) in accordance with a Service Operation, Administration, and Management (Service OAM) standard.

15. The method of claim 14, wherein the network element and the second network element are of the same Service OAM level.

16. The method of claim 9, wherein at least one of the first network interface and the second network interface is a line card.

17. An apparatus comprising:
- means for processing heartbeat messages received at a first network interface integral to a first network element from a second network element to determine a first status parameter associated with the second network element; and
- means for processing heartbeat messages received at a second network interface integral to the first network element from the second network element to determine a second status parameter associated with the second network element; and
- means for determining a status of the second network element based on the first status parameter and the second status parameter.

18. The apparatus of claim 17, wherein the at least one first physical port and at the at least one second physical port are configured as member ports of a link aggregation group.

19. The apparatus of claim 17, wherein:
- the first status parameter is indicative of whether the first network interface has received a heartbeat message from the second network element within a timeout threshold associated with the heartbeat message; and
- the second status parameter is indicative of whether the second network interface has received a heartbeat message from the second network element within the timeout threshold associated with the heartbeat message.

20. The apparatus of claim 19, wherein the means for determining the status of the second network element comprises means for determining whether at least one of:
- the first status parameter indicates that the first network interface has received the heartbeat message from the second network element within a timeout threshold associated with the heartbeat message; and
- the second status parameter indicates that the second network interface has received a heartbeat message from the second network element within the timeout threshold associated with the heartbeat message.

21. The apparatus of claim 20, wherein the determined status is indicative of whether at least one of the first network interface and the second network interface has received a heartbeat message from the second network element within the timeout threshold associated with the heartbeat message.

* * * * *